United States Patent [19]

Inoue

[11] Patent Number: 4,551,244
[45] Date of Patent: Nov. 5, 1985

[54] SPILLED OIL PROCESSING CATAMARAN

[75] Inventor: Junichi Inoue, Yokosuka, Japan

[73] Assignee: Hikari Industry Co., Ltd, Japan

[21] Appl. No.: 582,199

[22] Filed: Feb. 21, 1984

[30] Foreign Application Priority Data

Feb. 25, 1983 [JP] Japan .................. 58-29378

[51] Int. Cl.⁴ .............................................. C02F 1/40
[52] U.S. Cl. ............................ 210/198.1; 210/242.1; 210/925
[58] Field of Search .................. 210/198.1, 209, 242.1, 210/242.4, 924, 925

[56] References Cited

U.S. PATENT DOCUMENTS 3,800,950  4/1974  Hess et al. ................. 210/242.4
3,986,959 10/1976  Bagot et al. ............... 210/242.4
4,120,788 10/1978  Ellis ............................ 210/242.4
4,146,477  3/1979  Challener .................... 210/924

Primary Examiner—Ivars C. Cintins
Attorney, Agent, or Firm—Townsend & Townsend

[57] ABSTRACT

A spilled oil collection catamaran includes a submerged waterfoil extending between a pair of floats and submerged at its bow, a rotating impeller extending between the floats and above the waterfoil with its bottom partly dipped in the water, a spraying pipe extending between the floats and in front of the impeller for spraying a gelling agent for having the spilled oil drifting in the water surface gelled, and a vertically movable cage in the rear of the impeller for housing therein a porous collection bag which has an open side directed toward the bow to collect gelled oil in the bag. The catamaran also includes a spray gun at the bow for spraying the gelling agent over the spilled oil drifting in the water surface in front of the catamaran.

11 Claims, 5 Drawing Figures

SPILLED OIL PROCESSING CATAMARAN

BACKGROUND OF THE INVENTION

1. Field of the Invention

This invention generally relates to apparatus for collecting spilled oil floating on the water surface, for example, in a bay, harbor or lake, and particularly to a spilled oil processing apparatus preferably in the form of a catamaran for collecting spilled oil floating on the water surface by having it once gelled.

2. Description of the Prior Art

The present inventor previously invented a work ship in the form of a catamaran having a rotating impeller for collecting solid objects drifting on the water surface and it has since then been used in various fields thereby verifying its effectivity. This work ship is disclosed in Japanese Utility Model Publication No. 57-18238. Since the above-described work ship was developed exclusively for collecting solid drifting objects, it cannot be used for collection of particular liquid such as spilled oil drifting on the water surface. However, since oil may be produced only at selected places on the earth and it is necessary for daily life all over the globe, it must be transported to various other places. For this purpose, marine transportation has been increasingly used, and, thus, the occurrence of oil spillage has also increased thereby bringing about various problems such as killing of fish and dirtying of coast lines. Even in bays and harbors, small spills of oil from boats and ships may accumulate and the oil spill thus accumulated can become a nuisance to users of bays and harbors such as sailors and fishermen. There is thus an increasing concern for cleaning the water surface by collecting not only solid drifts but also particular liquid, in particular spilled oil, drifting in the water surface effectively.

Various approaches have been proposed to collect spilled oil drifting in the water surface, but they are mostly too difficult and/or expensive and lack versatility in usage. For example, in the prior art, those which are suited for a large-scale operation are usually not suited for a small-scale operation, thereby necessitating the adoption of different approaches depending upon the scale of a spilled oil clean-up operation. A main technological difficulty in collecting spilled oil from the water surface resides in preferential collection of oil. That is, if water is collected together with oil, the water must be separated and returned, which would lower the operational efficiency in collection of spilled oil.

According to recent studies, there has been developed a gelling agent which causes oil to be quickly gelled when mixed at an appropriate amount (approximately 30%) thereby converting the oil into hydrophobic solids. Then, the thus gelled oil may be easily retransformed into liquid when heated to an appropriate temperature (approximately 80° C.). On the other hand, if the thus gelled oil is first mixed with oil of the same quality and of the amount which is approximately ten times of the gelled oil and then heated to an appropriate temperature (approximately 80° C.), then the gelling agent may be separated out thereby producing reusable oil.

SUMMARY OF THE INVENTION

In accordance with one embodiment of the present invention, there is provided a work ship in the form of a catamaran for collecting oil drifting in the water surface efficiently. The catamaran is so structured to cruise stably even on rough waters and it includes an impeller rotatably supported at its bow and between the two parallel floats with its bottom slightly dipped in the water. The catamaran also includes a cage which is provided in the rear of the impeller, for example, at the center or stern to be movable up and down. The cage is so structured to detachably hold a net bag with one side thereof being open toward the bow. Thus, the cage may be immersed partly or completely in the water with the net bag therein when lowered, and the cage may be moved above the water thereby allowing removal of the net bag from the cage.

Accordingly, as soon as the catamaran has arrived at the site where oil to be collected is drifting in the water surface, a gelling agent capable of having oil gelled is sprayed over the drifting oil while cruising at a slow speed. Then, the gelling agent is positively mixed with the oil by the rotating impeller provided at the bow of catamaran thereby causing the oil to be gelled to be converted into the form of solids. As the catamaran further proceeds, the thus gelled oil is collected into the net bag installed in the cage since the net bag has its mouth opened toward the bow. When the bag becomes full of gelled oil, the bag is removed from the cage for further processing. The catamaran is preferably provided with a spraying device at its bow for spraying the gelling agent.

The following are the main features of the present invention when constructed in the form of a catamaran.

(1) The catamaran includes a rotating impeller disposed between its two parallel floats and at its bow so that as soon as a gelling agent for having oil gelled is sprayed over the oil drifting in the water surface, the gelling agent may be well mixed with the drifting oil thereby allowing conversion of the drifting oil into solids effectively. Preferably, the impeller is partly immersed in the water with its rotating axis extending normal to the lengthwise axis of catamaran. The catamaran also includes a waterfoil provided generally below the rotating impeller as connected between the two side floats. The waterfoil extends in the direction normal to the lengthwise axis of catamaran and it has a particular cross-sectional shape. That is, the waterfoil has a top flat surface, which is defined in the vicinity of bow and below the water surface, a bottom flat surface defined at the bottom of catamaran and downstream of the top flat surface, a curved top surface extending from the rear edge of the top flat surface downwardly curved to the rear edge of bottom flat surface and a curved bottom surface extending from the front edge of top flat surface downwardly curved to the front edge of bottom flat surface. The provision of such a waterfoil gives not only structural strength but also stability in operation. Besides, the waterfoil also contributes for smoother cruising at high speed and mixing of sprayed gelling agent with drifting oil.

(2) If the catamaran is provided with a spray gun and/or spraying pipe at its bow, as soon as the catamaran has reached a site for collecting spilled oil drifting in the water surface, it is only necessary for the operator to have the catamaran cruise at a slow speed as spraying a gelling agent over the spilled oil from the spray gun and/or spraying pipe. Thus, the present oil collecting catamaran is highly labor-saving, and, thus, extremely low in operating cost.

(3) The catamaran has a deck extending between the two side floats and at least one opening is provided in the deck in its central and/or stern portion. And, a cage, in which a collection net bag may be detachably installed, is provided such that it may be put into the water partly as lowered through the opening. Preferably, the cage is generally rectangular in shape with its top and front sides being open and with its bottom capable of being opened. Thus, during operation, the cage whose bottom is closed and which houses therein a collection bag is lowered through the opening of the deck into the water at least partly so that gelled oil may be collected into the bag as the catamaran advances. When the bag becomes full, the cage is moved upward above the water and the mouth of bag is tightly closed, and, thereafter, the bottom of the cage is made open to remove the bag full of gelled oil from the cage. In the preferred embodiment, a plurality of such cages are provided in a line along the lengthwise axis of catamaran, and the cages installed with collection bags are lowered to be partly immersed into the water one after another each time when the bag in use becomes full. In this case, removal of the bags full of gelled oil from the cages may be carried out after the catamaran has come alongside the pier.

(4) The collection bag to be used as installed in the cage is preferably comprised of strings such as nylon strings woven in the form of net and a closure member such as rope provided at the mouth of bag. Thus, when the bag becomes full of gelled oil, its mouth may be closed by tightening the rope; on the other hand, the rope may be untightened to make the mouth open again to remove the gelled oil for further processing after the bag has been transported to a processing site with its mouth closed. Alternatively, the bag may be opened after having been landed and the gelled oil inside the bag may be transferred to a number of vinyl bags which are then sealed and transported to a processing site.

(5) Various kinds of gelling agents may be used as long as they have the property of having the oil drifting in the water surface gelled. Preferred gelling agents are those which are fast in gelation of oil, highly hydrophobic or water-repelling and non-polluting. The most preferred gelling agents are those which may be easily separated from gelled oil, for example, by heating.

It is therefore a primary object of the present invention to provide an improved apparatus for collecting oil drifting in the water surface effectively.

Another object of the present invention is to provide a spilled oil clean-up apparatus which is easy to operate and adaptable to various situations.

A still further object of the present invention is to provide a work ship in the form of a catamaran for collecting oil drifting in the water surface by having the drifting oil once converted into solids.

A still further object of the present invention is to provide a spilled oil collecting catamaran which is high in oil collecting efficiency and excellent in maneuverability.

Other objects, advantages and novel features of the present invention will become apparent from the following detailed description of the invention when considered in conjunction with the accompanying drawings.

BRIEF DESCRIPTION OF THE DRAWINGS

FIG. 1b is a plan view of the catamaran shown in FIG. 1a;

FIG. 1c is a partial cross-sectional view of the catamaran shown in FIG. 1a;

DESCRIPTION OF THE PREFERRED EMBODIMENTS

Figure 1A:
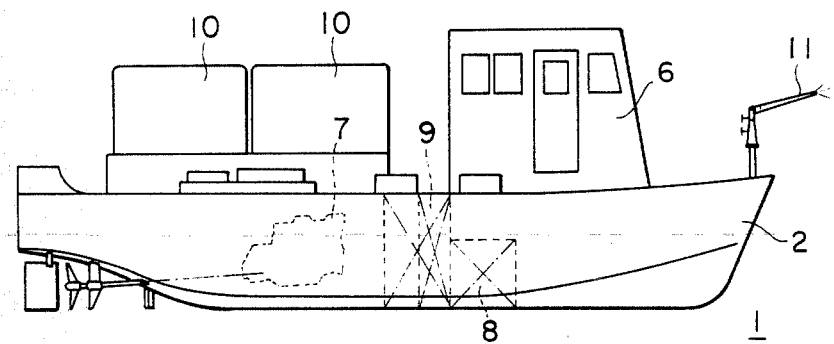
FIG. 1a is a side elevational view showing the overall structure of a spilled oil collecting catamaran constructed in accordance with one embodiment of the present invention.
Figure 1B:
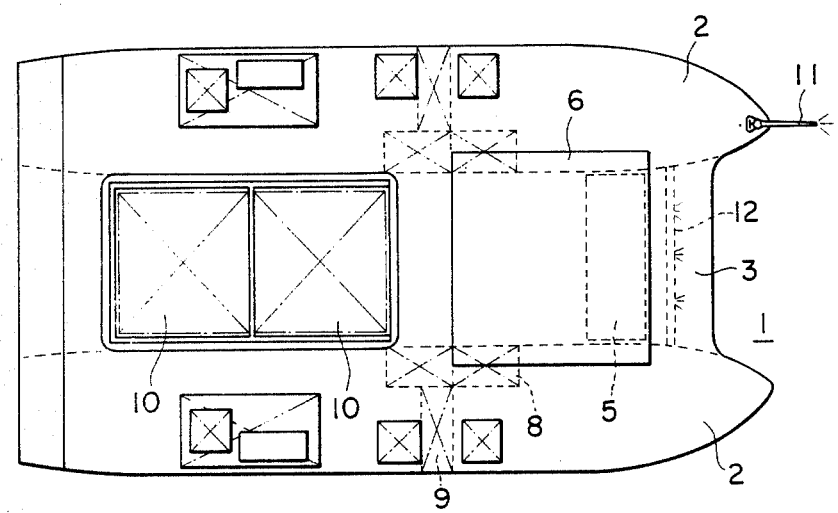
Figure 1C:
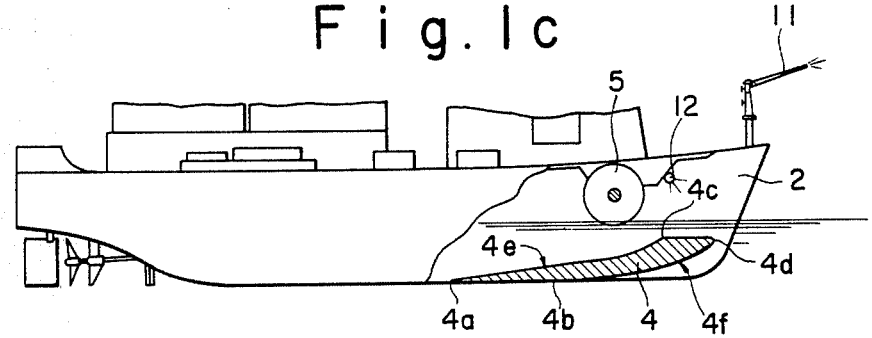

Referring now to Figs. 1a through 1c, there is shown a spilled oil collecting catamaran 1 for collecting spilled oil drifting in the water surface constructed in accordance with one embodiment of the present invention. As shown, the catamaran 1 is integrally formed generally by a pair of floats or hulls 2, 2 which are arranged in parallel as spaced apart from each other, a deck 3 extending between the pair of floats 2, 2 above the water surface and a submerged waterfoil 4 extending between the pair of floats 2, 2 in the bow portion of catamaran 1 as submerged in the water. As best shown in FIG. 1c, the waterfoil 4 is provided in the catamaran 1 as located closer to its bow and it has a particular cross-sectional shape. That is, the waterfoil 4 includes a top flat surface located horizontally in the vicinity of the bow and having a front edge 4d and rear edge 4c and a bottom flat surface located horizontally at the bottom of catamaran 1 downstream of the top flat surface and having a front edge 4b and a rear edge 4a. The waterfoil 4 also includes a top curved surface 4e which slopes down from the rear edge 4c of top flat surface to the rear edge 4a of bottom flat surface along a first smooth curved line and a bottom curved surface 4f which also slopes down from the front edge 4d of top flat surface to the front edge 4b of bottom flat surface along a second smooth curved line. These top and bottom curved lines are curved with smaller radii of curvature closer to the top flat surface and the radii of curvature become bigger as approaching the bottom flat surface, and, thus, the slopes become less and less steep from the top flat surface to the bottom flat surface.

Also provided in the catamaran 1 is an impeller 5 as rotatably supported between the floats 2, 2 and above the waterfoil 4. The impeller 5 may be driven to rotate around its rotating axis extending between the two floats 2, 2 and, thus, in the direction perpendicular to the longitudinal center axis of catamaran 1. As best shown in FIG. 1c, the rotating impeller 5 is so located that it becomes submerged partly at its bottom. Thus, when the impeller 5 is driven to rotate while the catamaran 1 advances at a slow speed, drifting objects such as spilled oil are stirred and lead into the space between the two floats 2, 2.

The catamaran 1 is also provided with a bridge 6 located close to the bow between the pair of floats 2, 2, a main engine 7 and a fuel tank 8. The catamaran 1 also includes a tank 9 for storing therein a quantity of gelling agent which is to be sprayed over spilled oil drifting in the water surface, as will be described more in detail later. The catamaran 1 also includes a pair of cages 10, 10 which are arranged side by side along the lengthwise center axis of catamaran 1 and which are provided such that they may be individually moved up and down by means of winches or the like as well known for those skilled in the art through an opening defined in the deck 3.

In the illustrated, preferred embodiment, the catamaran 1 further includes a spray gun 11 mounted at the bow of one of the two floats 2, 2 for spraying the gelling agent over spilled oil in the water surface as supplied from the gelling agent tank 9 under pressure through a conduit (not shown) as is well known for those skilled in the art. Preferably, the spray gun 11 is adjustable in orientation thereby allowing setting of the spraying direction at will. The illustrated catamaran 1 further includes a spraying pipe 12 which is provided as extending between the bows of the pair of floats 2, 2 in front of the rotating impeller 5 and which is fluidically connected to the gelling agent tank 9 through conduits and pumps (not shown) so that the gelling agent is also supplied to the spraying pipe 12. A plurality of holes are provided along the spraying pipe 12 and thus the gelling agent supplied to the spraying pipe 12 under pressure is sprayed over the water surface in front of the rotating impeller 5.

Figure 3:
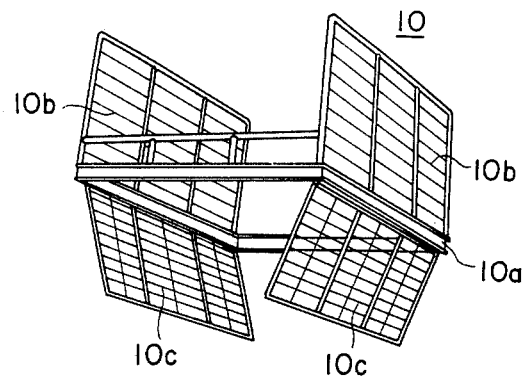
FIG. 3 is a perspective view showing a cage provided in the catamaran shown in Figs. 1a –1c for housing therein the net bag shown in FIG. 2.

As described above, the cages 10 and 10 may be individually moved upward above the water surface or downward as submerged in the water at least partly and each of the cages 10 and 10 is generally rectangular in shape as shown in FIG. 3 in the illustrated example. As shown in FIG. 3, the cage 10 includes a square-loop shaped frame 10a, a pair of side frames 10b, 10b each fixedly attached to one of opposite sides of square-loop shaped frame 10a as extending vertically upward and a pair of bottom doors 10c, 10c which may be pivotally moved to open or close the bottom of cage 10. Although not shown specifically, the square frame 10a may be provided with an engaging member which may be used to engage with the doors 10c, 10c when they are desired to be kept closed. Preferably, the side frames 10b, 10b and the bottom doors 10c, 10c are all made of ribs.

Figure 2:
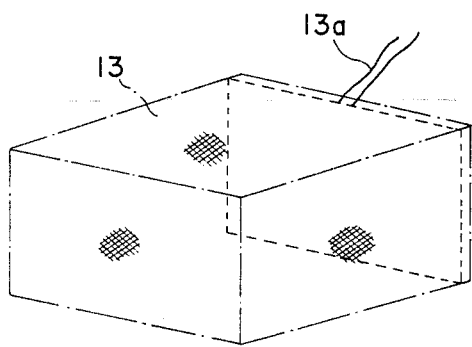
FIG. 2 is a perspective view showing a net bag to be used in the catamaran shown in Figs. 1a–1c for collecting gelled oil.

When the bottom doors 10c, 10c are closed, the generally box-shaped collection bag 13 may be installed in the cage 10. The collection bag 13 is made of a porous material such as net so that water may pass through the bag 13. The box-shaped collection bag 13 is open at one side thereby defining its mouth and around the edge of the mouth is provided a tightening member 13a such as rope as indicated by the dotted line in FIG. 2. Thus, the collection bag 13 is installed in the cage 10 with its mouth directed toward the bow of catamaran 1 so that water and any drifting objects in the water surface are lead into the collection bag 13 located partly submerged in the water as installed in the cage 10 while the catamaran 1 advances. The water thus lead into the bag 13 passes through the bag 13; however, the drifting objects such as gelled oil lead into the bag 13 become trapped therein.

When the collection bag 13 in use as installed in the lowered cage 10 becomes full, the cage 10 is moved upward by means of a winch (not shown) above the water surface, and, then, the mouth of bag 13 is closed by tightening the rope 13a. Preferably, however, the mouth of bag 13 is closed before moving the cage 10 upward because it is less likely to drop the contents collected in the bag 13. The rope 13a may be tightened manually or by means of a pulling device (not shown) mounted on the cage 10 as well known for those skilled in the art. The other cage 10 is moved downward to locate the collection bag 13 partly submerged in the water surface to collect drifting objects continuously.

Then, the collection bag 13 of the second cage 10 becomes full, its mouth is closed by the rope 13a and moved above the water surface. Then, the catamaran 1 goes to the pier and the bottom doors 10c, 10c are opened to take the bags 13, 13 out of the cages 10, 10. Then, the rope 13a of each of the bags 13 is untightened to have the collected objects, such as gelled oil, transferred to a number of small vinyl bags, which are, then, sealed and transported to a processing plant. Alternatively, if there is enough space on the deck 3, the filled bags 13 may be removed from the cages 10 by opening the bottom doors 10c, 10c and placed on the deck 3 and new empty bags 13 may be installed in the cages 10 to continuously carrying out the collection operation.

It is to be noted that instead of or in addition to the spray gun 11 and/or spraying pipe 12, a rubber hose (not shown) may be provided as fluidically connected to the gelling agent tank 9. In this case, the operator may sprinkle the gelling agent over a desired area on the water surface while standing on the deck 3 or float 2. It should also be noted that since the bag 13 is installed in the cage 10 when in use, it may be comprised of fine strings and required durability is relaxed.

As described above, in accordance with the present invention, since the spilled oil collection apparatus is generally in the form of a catamaran 1 including a pair of parallel floats 2,2 and a submerged waterfoil 4 integrally provided and extending between the pair of floats 2, 2 at the bow, it is stable both in cruising as well as in collection operation. The present catamaran 1 can cruise at high speed stably even through rough waters and start collecting spilled oil by stably cruising at a slow speed, and it is not adversely affected by any kind of waves. The submerged waterfoil 4 has the effect of stabilizing the water passing between the pair of floats 2, 2 thereby easing the high speed cruising and promoting the mixing of gelling agent with spilled oil drifting in the water surface. Furthermore, since the rotating impeller 5 is provided at the bow between the floats 2, 2 with its bottom dipped in the water, the spilled oil sprayed with gelling agent is positively lead into the space between the floats 2, 2 and at the same time the gelling agent may be well mixed with the oil thereby having the oil gelled highly efficiently. The thus gelled oil may be effectively collected because of the provision of the vertically movable cage 10 which is located downstream of the rotating impeller 5 and which detachably houses therein the porous collection bag 13. If an appropriate gelling agent is used, the spilled oil may be recycled because reusable oil may be produced by an appropriate processing as described above.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A spilled oil collecting apparatus for collecting spilled oil drifting in the water surface, comprising:
    a pair of floats arranged in parallel spaced apart relation over a predetermined distance;
    a deck integrally provided with and extending between said pair of floats, said deck being provided with at least one opening;

a connection member extending between said pair of floats, said connection member being disposed at the front of said apparatus in a position to be submerged in the water when said apparatus is afloat;

an impeller rotatably supported between said pair of floats and disposed generally above said connection member, said impeller being dipped in the water partly at its bottom;

at least one cage supported to be movable up and down through said opening provided in said deck, said cage being capable of housing therein a one side-opened porous collection bag with its open side directed to the front of said apparatus;

advancing means for advancing said apparatus along the water surface; and spraying means for spraying a gelling agent for causing oil to gel over the water surface in front of said apparatus.

2. The apparatus of claim 1 wherein said connection member is a waterfoil having, in cross section, a top flat surface, a bottom flat surface located in the rear of and below said top flat surface, a top curved surface extending along a first curved line from a rear edge of said top flat surface to a rear edge of said bottom flat surface and a bottom curved surface extending along a second curved line from a front edge of said top flat surface to a front edge of said bottom flat surface.

3. The apparatus of claim 2 wherein said bottom flat surface is located in a plane defined by the bottoms of said pair of floats.

4. The apparatus of claim 3 wherein said first and second curved lines are defined such that the radius of curvature is smaller near the top flat surface than near the bottom flat surface.

5. The apparatus of claim 1 wherein said spraying means includes a spraying pipe provided in front of said impeller and extending between said pair of floats and above the water surface, said spraying pipe being provided with a plurality of holes and connected to a gelling agent supplying source.

6. The apparatus of claim 5 wherein said spraying means further includes a spray gun provided at the front of said apparatus and connected to receive gelling agent from said source for spraying the gelling agent over the water surface in front of said apparatus.

7. The apparatus of claim 1 wherein a plurality of said cages are provided and arranged in a line along a center longitudinal axis of said apparatus.

8. The apparatus of claim 1 wherein said cage is generally rectangular in shape and has a bottom which may be opened and closed.

9. The apparatus of claim 1 wherein said porous collection bag has a mouth defined by said open side and a tightening member is provided along said mouth, whereby the mouth of said bag may be opened and closed by tightening and untightening said tightening member.

10. The apparatus of claim 9 wherein said porous collection bag is made of net and said tightening member is rope.

11. The apparatus of claim 1 wherein said gelling agent has a property such that the oil gelled by said gelling agent may be liquified by heating and reusable oil may be produced by mixing with an appropriate amount of oil at an elevated temperature.

* * * * *